United States Patent
Deutsch et al.

[11] Patent Number: 6,052,391
[45] Date of Patent: Apr. 18, 2000

[54] DYNAMIC ASSIGNMENT OF SUBRATE VOICE CHANNELS IN TELECOMMUNICATION NETWORKS

[75] Inventors: Douglas Anthony Deutsch, Aurora; David B. Smith, Hinsdale, both of Ill.

[73] Assignee: Lucent Technologies Inc., Murray Hill, N.J.

[21] Appl. No.: 09/032,056

[22] Filed: Feb. 27, 1998

[51] Int. Cl.⁷ .............. H04J 3/22; H04L 12/50; H04Q 11/00
[52] U.S. Cl. .................. 370/540; 704/500; 370/376
[58] Field of Search .............. 370/545, 537–541, 370/375, 376, 501; 704/500

[56] References Cited

U.S. PATENT DOCUMENTS

| | | | |
|---|---|---|---|
| 4,143,242 | 3/1979 | Horiki | 179/15 |
| 5,533,022 | 7/1996 | Hiraiwa | 370/68.1 |
| 5,586,193 | 12/1996 | Ichise et al. | 381/106 |
| 5,983,192 | 11/1999 | Botzko et al. | 704/500 |

*Primary Examiner*—Douglas W. Olms
*Assistant Examiner*—David R Vincent
*Attorney, Agent, or Firm*—Werner Ulrich

[57] ABSTRACT

Apparatus for switching full-rate (e.g., 64 kilobit per second) signals and composite signals comprising a plurality of sub-rate signals (e.g., 32 kilobit per second sub-rate signal). The apparatus includes a unit for compressing selected ones of a plurality of full rate signals into a smaller plurality of full rate single and composite signals, and apparatus for expanding composite signals into full rate signals. Advantageously, during periods of heavy load, the switching network fabric of a switching system can carry more calls, and more traffic can be carried between switches equipped for sub-rate switching.

5 Claims, 6 Drawing Sheets

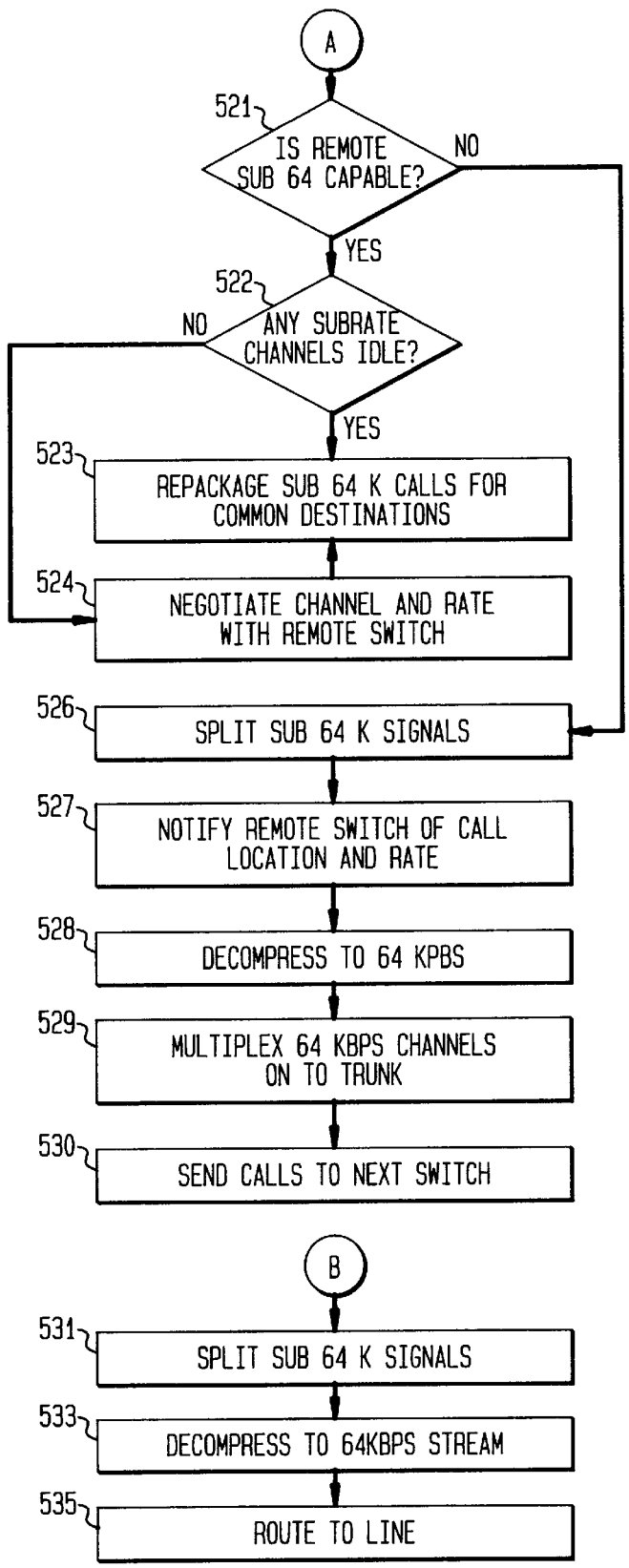

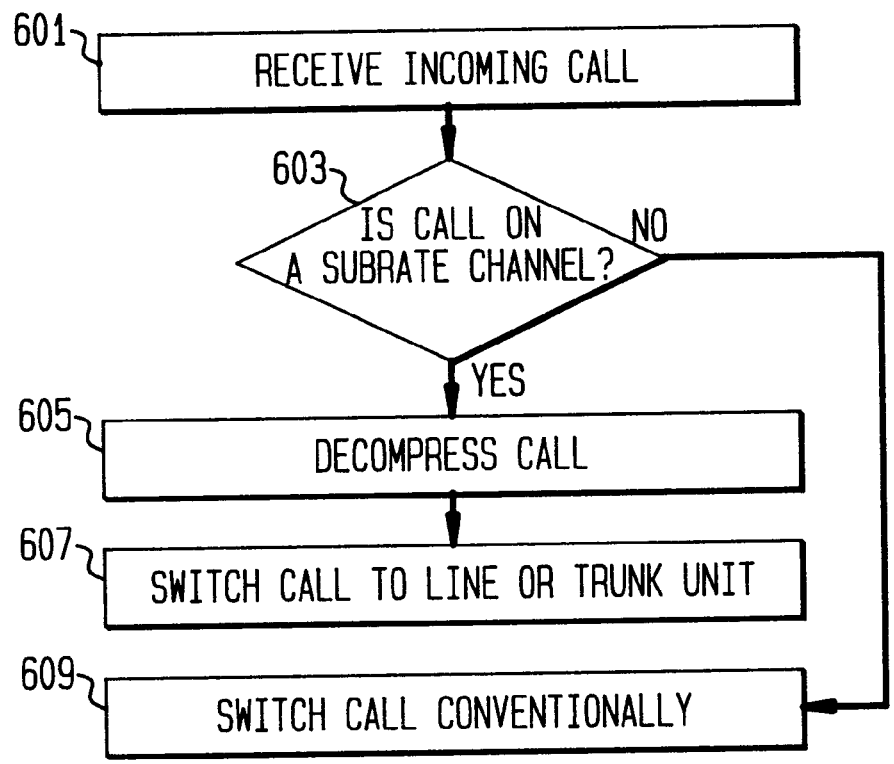

DYNAMIC ASSIGNMENT OF SUBRATE VOICE CHANNELS IN TELECOMMUNICATION NETWORKS

RELATED APPLICATION

This application is related to an application entitled "Subrate Voice Switching Over Switching and Telecommunications Networks" being filed concurrently by the inventors of this application and being assigned to the same assignee.

1. Technical Field

This invention relates to methods and apparatus for switching digital voice signals in telecommunication networks.

2. Problem

Today, a very large fraction of voice telecommunications traffic is transmitted in digital form. Most of this traffic is transmitted as a series of pulse code modulation (PCM) signals wherein eight thousand samples per second are transmitted each as an eight bit quantity. The 64 kilobit per second signal faithfully reproduces voice signals in the telephone band (i.e., between 200 and 3300 Hertz). It is well known that 64 kilobits are not required to faithfully reproduce voice signals in the telephone band. Recently, many low cost coder/decoders (Codecs) have been found which will transmit the faithful reproduction of voice signals at subrates of 32 kilobits per second, 16 kilobits per second, 8 kilobits per second and even lower rates, thus permitting a full rate (64 kilobits per second) channel to convey multiple voice signals. As a result, the opportunity exists to use present time slot interchange (TSI) switches, designed to switch 64 Kb signals, for switching many more voice signals than is possible with the exclusive use of 64 kilobits per second coding and switching. However, the prior art does not teach any good way of mixing different voice signal rates in economical switching systems without requiring a radical redesign of these systems and a very costly replacement effort.

Once the sub-rate signals have been generated and switched, an opportunity exists for sending such sub-rate signals to distant switching systems, thus preserving band width and allowing for a better utilization of the transmission facilities interconnecting to switching systems. A problem of the prior art is that the prior art does not teach any arrangement for generating and switching sub-rate signals for transmission to a connected switching system.

SOLUTION

The above problem is solved and an advance is made over the prior art in accordance with our invention wherein sub-rate voice signals are generated and bundled into full rate signals (e.g., 64 kilobit signals) prior to being switched in a digital switch such as a TSI switching network (switch); the bundling is performed in such a way as to minimize intermediate sub-rate switching by assembling sub-rate signals for a common destination (port). A line or trunk unit, for serving lines or trunks whose service profile indicates that they may use compressed (subrate) signals, comprising a plurality of 64 K Codecs is connected to a first unit which compresses selected 64 K signals and bundles them into a smaller number of 64 K outputs. These bundled signals are then switched, using existing switching TSI fabrics, transmitted to a destination switch module, and unbundled in a second unit which decompresses bundled 64 K signals into single voice 64 K signals for transmission to a destination line or an intermediate trunk. Compression is advantageously used if a common intermediate or final destination can process bundled Subrate signals. The bundled signals are then transmitted to a distant switch where they are unbundled, switched and decompressed. 64 K channels for the transmission of bundled subrate signals are dynamically assigned as needed to support traffic to the destination of the 64 K channel. The distant office is informed of the identity of the particular communication through common channel signaling (CCS7) messages, or by means of control and status messages sent over packet networks, such as the Internet.

BRIEF DESCRIPTION OF THE DRAWINGS

FIGS. 4 and 5 are flow diagrams showing the progress of an originating call; and FIG. 6 is a flow diagram showing the progress of an incoming call.

DETAILED DESCRIPTION

Figure 1:
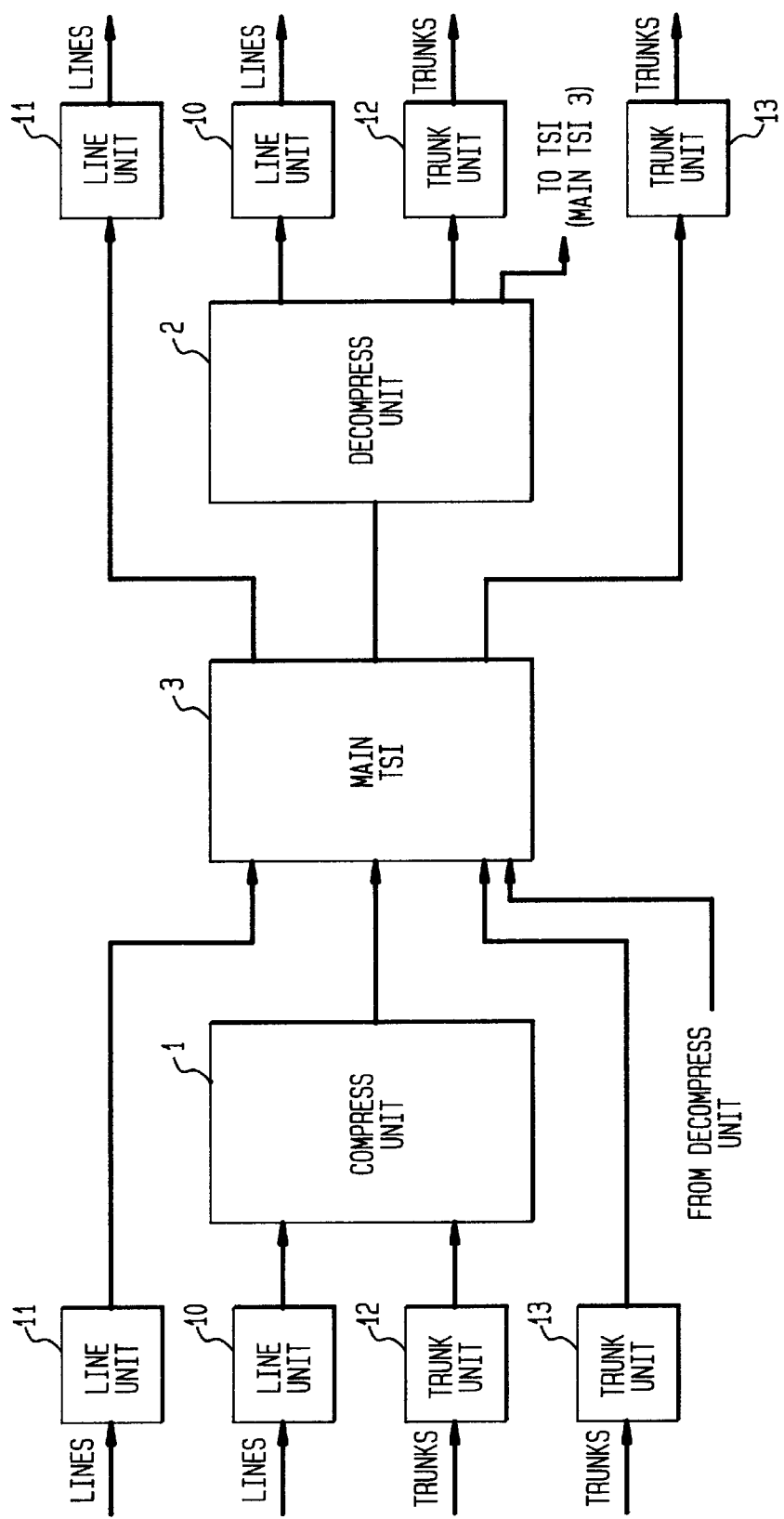
FIG. 1 is a block diagram illustrating the switching configuration for compressing and switching compressed voice signals.

FIG. 1 is a Block diagram illustrating the basic principles of Applicants invention. Only one direction of transmission is shown since the other direction is basically identical. The switching fabric of Applicants' invention comprises: a compress unit 1 for optionally compressing selected 64 K signals into 32 K, 16 K, or 8 K signals as appropriate based on the service order for the affected customer a main TSI unit 3 for switching multiplexed 64 K signals, some of which may contain subrate signals; and a decompress unit 2 for accepting multiplexed 64 K signals, some of which may contain sub-rate signals and expanding any sub-rate signals received from the main TSI unit into 64 K signals. Line units 10 and 11 are shown, line unit 10 being connected to the compress unit 1, and line unit 11 being connected directly to the main TSI 3. Line unit 11 serves lines whose 64 K signals are not compressed, whereas line unit 10 serves lines whose 64 K signals are compressed as directed. Trunk units 12 and 13 are connected to interoffice trunks entering the switching system shown in FIG. 1. Trunk unit 12 serves trunks, some of which may carry compressed signals. Trunk unit 13 which is directly connected to main TSI 3 serves trunks which do not carry compressed (i.e., sub-rate) signals. Similarly, decompress unit 2 is connected to Line unit 10, and Trunk unit 12 for carrying outgoing signals, and also has an output connected to the Main TSI Unit 3, to allow decompressed signals to be reswitched.

While the Main TSI Unit 3 as shown in FIG. 1 is a single block, in many digital systems this block comprises a plurality of TSI modules. In some systems, TSI modules can be interconnected by a time multiplexed switch as in the 5ESS®-2000 switch manufactured by Lucent Technologies, Inc.; the Main TSI Unit 3 includes such time multiplexed switches. Many other TSI arrangements are known in the prior art, including a plurality of stages of pure TSI switches. The main point is that the block labelled Main TSI Unit 3 is used for switching multiplexed 64 K signals; the Main TSI Unit 3 does not perform any subrate switching.

Figure 2:
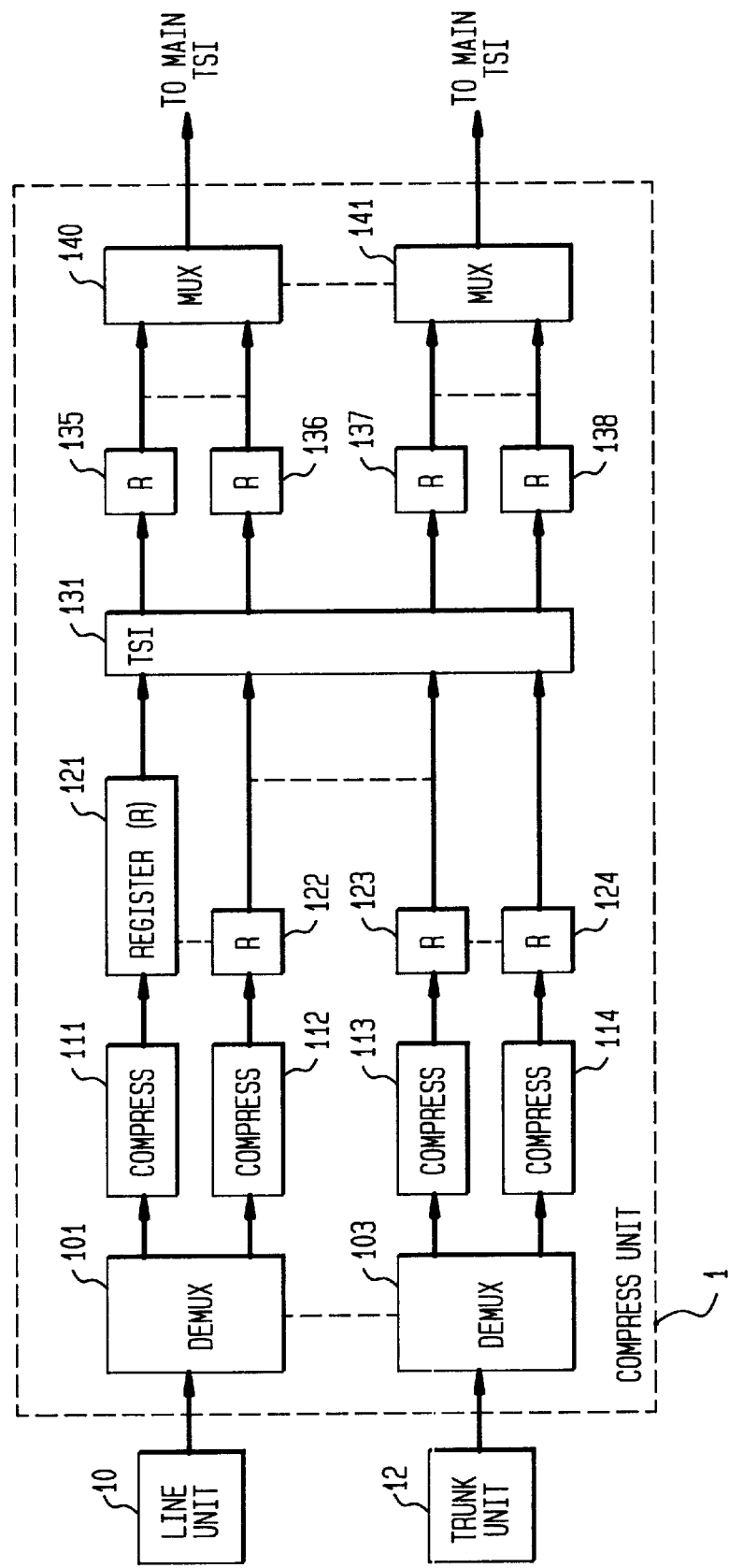
FIG. 2 is a block diagram of a voice compression unit.

FIG. 2 shows details of the compress unit 1. Signals received from line unit 10 are fed to a demultiplex unit 101 whose outputs are fed to a plurality of compressed units 111, . . . , 112. In order to handle the case in which no compression of the 64 K signals is desired, one or all of the compressed units can have a pass through state where they simply transmit a 64 K signal. In the preferred embodiment shown in FIG. 2, each of the compressed units receives a 64 K signal, and generates a 64 K, 32 K, 16 K, or 8 K sub-rate signal which is fed to its corresponding register. The register 121 is fed by compressed unit 111, . . . , register 122 is fed by compressed unit 112.

Demux unit 103 is connected to trunk unit 12. The output of Demux unit 103 is sent to split/compress units 113, . . . , 114. These units perform the split function to split a 64 K signal into a plurality of subrate signals if the 64 K signal carries subrate signals, and if the incoming trunk carries subrate signals multiplexed into a 64 K bit stream. Signaling messages, sent over CCS7 or some reliable packet network, alert the switch at the far end of a trunk that the trunk is carrying multiple subrate signals ("stuffed 64 K" signals) and the makeup (e.g., 16, 8, 8, 32 Kb subrate signals) of the 64 K bit stream. The split/compress units perform the compress function if the incoming trunk signal carries only a basic 64 K voice channel, and it is desirable to convert a plurality of such 64 K channels into a plurality of subrate signals for switching within the switch of FIG. 1, and for possible transmission as subrate signals to another switch if the switch of FIG. 1 is acting as a tandem switch for a particular incoming 64 K signal. In case neither splitting nor compression is being evoked for a particular incoming 64 K signal, the split/compress unit has the capability for simply passing the 64 K signal directly to its corresponding output register. The switch contains intelligence to determine the subrate, if any, for calls switched to a particular line or trunk, based on the class of service of that line or trunk, and optionally, the class of service of the terminating line in a distant switch.

The output registers of the compress unit 111, . . . , 112, and split/compress units 113, . . . , 114, namely registers 121, . . . , 122 and 123, . . . , 124 respectively are inputs to a TSI unit 131. TSI Unit 131 is controlled to sample its input registers in such a way as to bundle together the subrate signals that are destined for a common decompress unit. The outputs of TSI unit 131 are all 64 K signals, some of which may be carrying subrate signals ("stuffed 64 K"). For the case in which an output signal of TSI unit 131 carries a plurality of input subrate signals to TSI unit 131, the control memory of the TSI is arranged to sample the registers containing a subrate signal at a sub-multiple of the basic 8 kilohertz sampling rate of the TSI. The output of the TSI 131 feeds a plurality of registers 135, . . . , 136; . . . ; 137, . . . , 138 which feed a plurality of multiplexers 140, . . . , 141 which in turn are the inputs to the main TSI unit 3.

Figure 3:
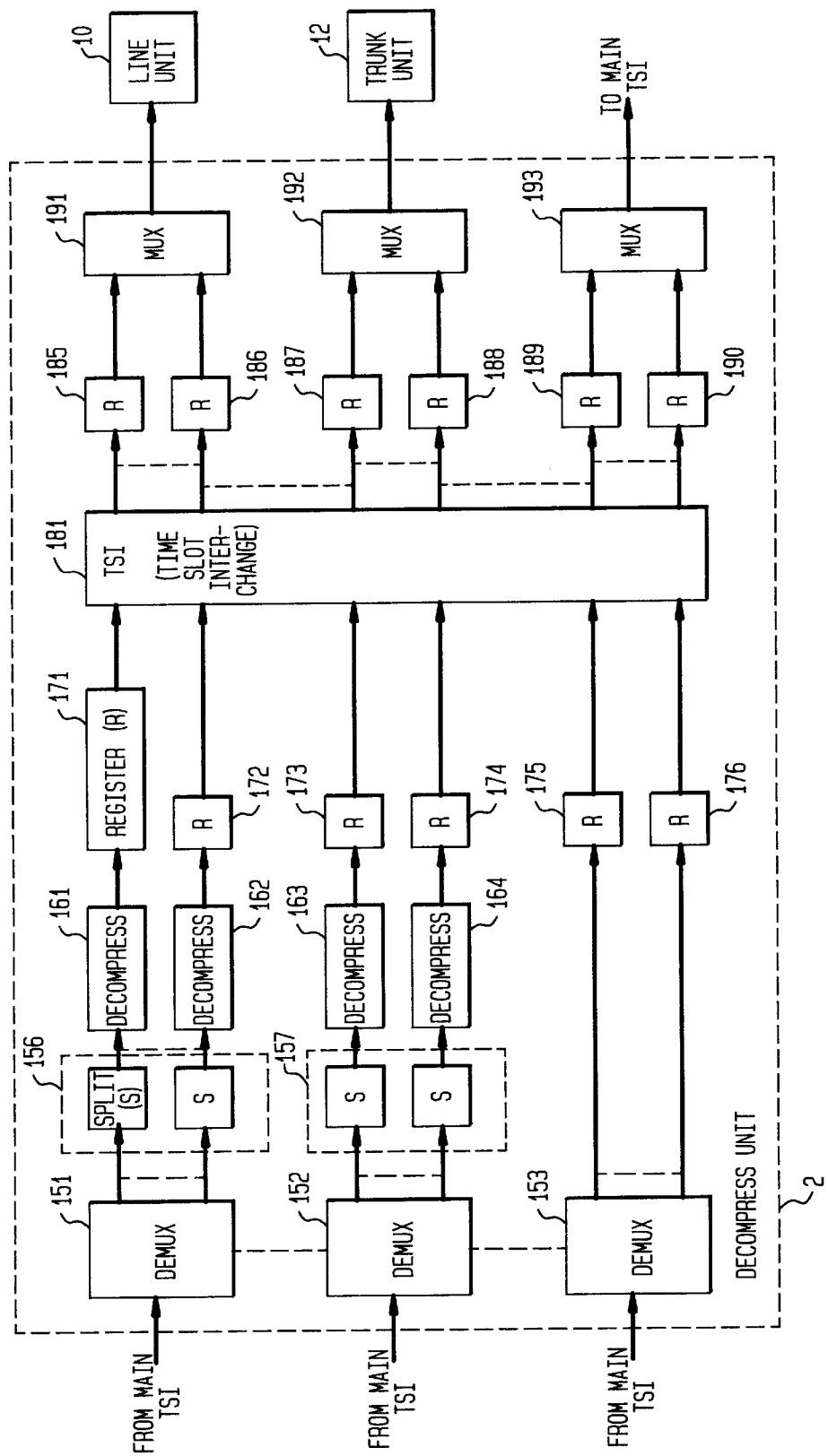
FIG. 3 is a block diagram of a decompression unit.

FIG. 3 is a block diagram of the decompress unit 2. Inputs are received in demultiplexers 151, . . . , 152, . . . , 153. Demultiplexers 151 and 152 are shown as being connected to decompress circuits 161, . . . 162; . . . ; 163, . . . , 164 respectively. The decompress units are each connected to a register feeding a TSI unit 181. Demultiplex 153 directly feeds a group of registers 175, . . . , 176 connected to TSI unit 181. Demultiplex 151 and 152 are used for signals, some or all of which may be in compressed form, and require decompression in order to generate a 64 K signal as an input to a line or trunk unit. Demultiplexer 153 directly feeds registers 175, . . . , 176 connected to TSI unit 181, and receives signals that are not to be decompressed. The signals are either already in 64 K form, or are to be transmitted as multiplexed compressed signals to a trunk unit for transmission in the multiplexed compressed form. All the inputs to TSI unit 181 are 64 K signals, each representing either a single communication or a multiplexed group of compressed communications, and the outputs of TSI 181 are decompressed (full rate) signals sent to registers 185, . . . , 186; . . . ; 187 . . . , 188 which feed multiplexers 191, . . . , 192. These latter multiplexers are then connected to line or trunk units for connection to line or trunk facilities. In addition, registers such as 189, . . . , 190 feed multiplexers such as 193, whose output signal is sent back to main TSI unit 3 for further switching.

Between demultiplexer 151 and the decompress units 161, . . . , 162 is a signal splitting unit 156 to supply to the decompression unit the correct sub-channel required by that decompression unit. In case no decompression is required for the signals from the Demultiplexer, one of the outputs of the splitting unit is simply the received 64 K signal which bypasses decompression, for example, by being fed to a decompression unit which is in a state wherein it simply passes its input signal to a TSI input register such as register 171.

Figure 4:
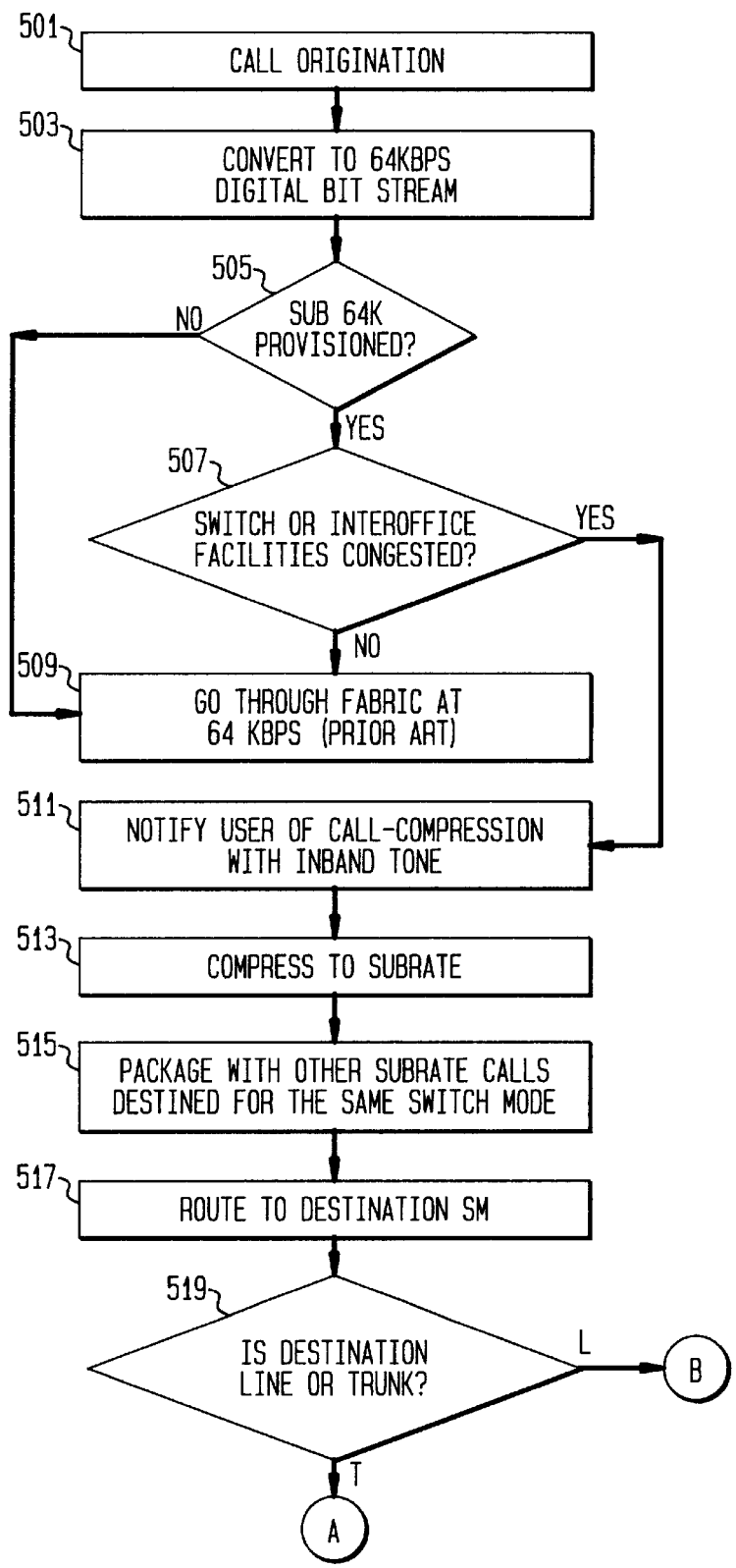

FIGS. 4–5 illustrate the method of applicants' invention for an originating call. A call is originated (Action Block 501 (FIG. 4); the call communication signal is converted into a full rate 64 kilobit per second digital bit stream (Action Block 503). Test 505 is then used to determine if this switch is provisioned to derive subrate signals. If not, then the call goes through the switching fabric of the originating switch at 64 kilobit per second (Action Block 509) and is subsequently treated as in the prior art. If this switch is provisioned for subrate ("stuffed 64 K") switching, then test 507 is used to determine whether the switch is congested, i.e., whether the traffic load exceeds a threshold, or whether the transmission facilities to the destination switch are congested, i.e., carrying more traffic than a threshold. If neither of these conditions exist, then Action Block 509 previously described is entered. If there is congestion, then the user is notified of the call compression with an in-band tone or an out of band message (Action Block 511), after first determining whether the service profile of the calling customer allows for compression of his/her signals, and the 64 kilobit signal is compressed to some permitted subrate (e.g., 32 K, 16 K, or 8 K), (Action Block 513). Note that while in this example a 32 kilobit sub-rate is used as the specific subrate being implemented, the switch can be arranged to provide different subrates which preferably should be a sub-multiple of the 64 kilobit full rate. It may well be that initially only a 32 kilobit subrate is used; as the switches become more heavily loaded, 16 kilobit subrate, or even 8 kilobit subrate signals can be used. This can be determined by service provisioning, and by resource congestion.

Subrate signals are then bundled along with other subrate calls and "stuffed" into 64 kilobit signals each destined for a common switching module (SM), (Action Block 515). The bundling which takes place in Action Block 515 can also include bundling of separate traffic of a compressed full rate incoming trunk as further discussed below with respect to Action Block 523, and as shown with respect to Demultiplexer 103 and split/compress circuits 113 and 114 of FIG. 2. Test 519 is then used to determine in the destination switch module if the destination is a line or trunk. If test 519 indicates that the destination is a trunk, then, test 521 (FIG. 5) is used to determine whether the trunk is connected to an office that is capable of accepting subrate signals, and is willing to accept such signals. Determining the result of test 521 can be performed as a data base look-up in the originating switch, or can be performed as a query of the connected switch or a query of a shared data base. If not, then subrate signals are split (Action Block 526), the connected switch is notified (Action Block 527), and decompressed to 64 kilobit per second signals (Action Block 528). They are then multiplexed as 64 kilobit per second channels onto a trunk in a trunk unit such as trunk unit 12, (Action Block 529), and the calls are sent to the next switch, (Action Block 530).

If the remote switch is capable of accepting sub-rate signals, (positive result of test 521), then test 522 is used to determine whether any sub-rate channels to the remote are idle. If so, then the subrate calls are repackaged for common destinations so that a plurality of calls, the number determined by the compression ratio, can be transmitted over a single 64 K channel to the remote switch. The remote switch is then notified via CCS7 message of the call location and rate, i.e., the particular channel carrying the call, the rate of the call, and the particular position of that call within a 64 kilobit signal. The actions of Action Blocks 529 and 530 previously described, are then followed. If no subrate channels are idle, (negative result of test 522), then this switch negotiates with the remote switch concerning a 64 kilobit channel and the rate of sub-channels to be used. After a successful negotiation, Action Block 523 (previously described) is entered.

If the result of Test 519 (FIG. 4), has indicated that the call is to be transmitted to a line, then any subrate signals are split (Action Block 531 (FIG. 5) ), and expanded (Action Block 533), and routed to the terminating line (Action Block 535).

FIG. 6 illustrates an incoming call. The incoming call is received (Action Block 601). A test is made whether the call is a subrate call (Test 603). If not, the call is processed conventionally (Action Block 609). If so, the call is decompressed (Action Block 605). The decompressed call is then switched to a destination line or trunk unit (Action Block 607). Where possible, the decompression should be performed in a unit connected to a destination line or trunk unit of the call; if this is not possible because other subrate calls of the same 64 K channel are already being routed to a decompress unit not connected to the destination unit, then the decompressed call is connected back to the Main TSI Unit for further switching.

The above description is of the most generalized application of Applicants' invention. The cost of different piece parts and of transmission facilities will help to determine which features of Applicants invention should be used for a particular switch, or for a particular application. For example, Applicants have shown arrangements which allow the various sub-channels of an incoming trunk to be unbundled, and rebundled into a new 64 K signal prior to being switched in the main TSI. In alternative arrangements, such trunks could be connected directly to the main TSI and if necessary, their decompressed signals derived after having been switched as one bundle to the Main TSI could, if necessary, be re-switched through the main TSI to a different switching module. The arrangement has been generalized to allow for the use of a plurality of different compression rates. Clearly, if the cost of compression rates below 32 K is high, then it might be economical to use this arrangement only for compressing to 32 K. In the preferred embodiment, a tone signal is provided whenever a call signal is compressed: alternatively, a signal for actuating a visual display or lamp may be used. In view of the high quality of compression to 32 K, it may not be necessary to warn users of compression unless compression to a lower rate such as 16 K, or 8 K is used. Clearly, one advantage of compressing only to 32 K is that it is necessary to provision only two compress circuits, and two decompress circuits for each 64 K signal appearing at the demultiplexer input to the compress unit 1 and decompress unit 2.

In this specific embodiment, a separate split circuit precedes the decompress circuit of decompress unit 2. In other embodiments, the splitting circuit can be made part of the decompress circuit, and can simply act as a selector of incoming bytes to be used by the decompress circuit.

In Applicants' preferred embodiment, incoming trunks are connected to a split/ compress circuit 113 which permits compression if a trunk is carrying only a single signal, or splitting into a plurality of sub-rate signals if the trunk is carrying a composite signal. An alternative would be to connect such trunks directly to the main TSI, and for the case in which the trunk is carrying a composite signal, switching that composite signal to a decompress unit, one of whose output multiplexers is connected back to the input of the main TSI unit 3 for further switching of the decompressed (64 K) signals, representing the sub-rate signals carried by the trunk.

For private networks supported by public switches and facilities, dedicated subrate channels can be used over dedicated facilities. This would allow the users of the private networks to pay a lower tariff since they would require fewer dedicated trunks.

It is also possible to supply a line such as an ISDN (Integrated Services Digital NetD. work) line with compress and decompress circuits to allow that line to carry multiple channels. The output of such a line to the switch would normally bypass compression in the switch, for example, by being connected to a line unit such as line unit 11, and its input from the switch would be a multiple channel signal that would not have been decompressed. For an ISDN line, the signaling channel can convey to the switch the breakdown of subrate channels of a 64 K signal, and the identity of the destination of each subrate channel, or in the other direction, the identity of the customer's channel for each of the received subrate channels. The subrate channels received in the switch from such lines can then be switched using the TSI of the decompress unit, and if necessary, the reswitching facility through Main TSI Unit 3. When all subrate channels of such a line have a common destination, no subrate channel switching is performed in the switch and the full 64 K signal is switched as a single entity.

The above description is of one preferred embodiment of Applicants' invention. Many other embodiments will be apparent to those of ordinary skill in the art. The invention is limited only by the attached claims.

What is claimed is:

1. In the telecommunications network, a method of establishing a voice call comprising the steps of:

compressing a plurality of incoming full-rate signals including signals for said voice call into a plurality of subrate signals;

combining said plurality of subrate signals into a composite full-rate signal;

switching said composite signal through a switching fabric of a first switching system;

dynamically assigning a trunk of said first switching system connected to another switching system of said telecommunications network for carrying said composite signal;

in said first switching system, switching said composite signal toward said assigned trunk; and transmitting said composite signal over said trunk to said another switching system for decompression and transmission of said signals for said voice call toward a destination of said voice call.

2. The method of claim 1 wherein the step of dynamically assigning said trunk comprises the steps of:

testing whether any trunk to said another switching system has an available sub-channel; and responsive to determining that no trunk for carrying a composite signal to said another switching system has an available sub-channel, assigning a trunk to said another switching system for carrying a composite signal.

3. The method of claim 2 further comprising the step of:

if any trunk to said another switching system has an available sub-channel, transmitting subrate signal for said call over one of the available sub-channels.

4. The method of claim 1 further comprising the step of:

notifying a switch at another end of said assigned trunk that said trunk is carrying subrate signals;

whereby said switch at another end of said trunk is warned not to compress signals received on said assigned trunk.

5. The method of claim 4 wherein the step of notifying further comprises the step of:

notifying said switch at another end of said trunk of an identity of communications on subrate channels of said trunk.

* * * * *